United States Patent [19]

Hadeishi et al.

[11] Patent Number: 4,941,743

[45] Date of Patent: Jul. 17, 1990

[54] HIGH STABILITY HIGH INTENSITY ATOMIC EMISSION LIGHT SOURCE

[75] Inventors: Tetsuo Hadeishi, Kensington; Thurston Le Vay, Arcadia, both of Calif.

[73] Assignees: Gruen Optik Wetzlar GmbH, Wetzlar, Fed. Rep. of Germany; Glass Instruments Inc., Pasadena, Calif.

[21] Appl. No.: 254,627

[22] Filed: Oct. 7, 1988

[51] Int. Cl.[5] .......................... G01J 3/443; H01J 7/24; H01J 13/32; H01J 61/52

[52] U.S. Cl. .................................... 356/311; 315/116; 315/117

[58] Field of Search ................ 356/311, 313; 315/115, 315/116, 117, 118

[56] References Cited

U.S. PATENT DOCUMENTS 3,686,529 8/1972 Boland ................................ 315/115
4,001,633 1/1977 van Tongeren et al. ....... 315/116 X
4,101,807 7/1978 Hill ...................................... 315/116
4,518,895 5/1985 Lehman .............................. 315/117
4,533,853 8/1985 Hammond et al. ............. 315/116 X

FOREIGN PATENT DOCUMENTS

47211/79 11/1979 Australia .
61770/80 3/1981 Australia .
3005638C2 5/1987 Fed. Rep. of Germany .

*Primary Examiner*—Vincent P. McGraw
*Attorney, Agent, or Firm*—Foley & Lardner, Schwartz, Jeffery, Schwaab, Mack, Blumenthal & Evans

[57] ABSTRACT

A highly stable high intensity atomic emission light source has a discharge region and the sample region each controlled by a separate heater. The sample region heater is controlled by a lamp stabilizer circuit which maintains the breakdown voltage within the discharge region at a constant level, thus providing a stable and high intensity light source.

7 Claims, 3 Drawing Sheets

BASIC LAMP CONFIGURATION

LAMP STABILIZER 120

DISCHARGE VOLTAGE V(L) MEASUREMENT

DISCHARGE VOLTAGE V(L) WAVEFORM

HIGH STABILITY HIGH INTENSITY ATOMIC EMISSION LIGHT SOURCE

BACKGROUND OF THE INVENTION

The most common light source for atomic absorption spectroscopy is a hollow cathode lamp (HCL). In the past, several intensive efforts were attempted to construct alternate light sources, mainly electrodeless discharge lamps (EDL). However, in spite of the extreme high intensity and the concentration of the high intensity on resonance lines, these lamps are not always used in atomic absorption spectroscopy. The main reasons these lamps are not always used are: (1) lack of intensity stability, and (2) a very short life.

Discharge lamps utilized in spectroscopy are illustrated, for example, in German Patentschrift DE 3005 638 and U.S. Pat. No. 3,686,529 incorporated herein by reference. DE 3005 638 discloses a lamp design with internal heating of the discharge path T1 and the reserve section T2, with the temperature of the discharge path T1 being higher than that of the reserve section T2. U.S. Pat. No. 3,686,529 shows a glow discharge lamp with separate power supplies for the lamp current and heater to provide an operating temperature independent of operating current.

SUMMARY OF THE INVENTION

The present invention possesses all of the desirable characteristics of EDL lamps along with high stability and long life comparatable to or superior to practically any HCL. The present invention maintains the operating parameters of the discharge lamp constant (discharge voltage, lamp current, gas pressure etc.) by controlling the temperature of the sample region. This method of control results in a very stable light intensity.

The invention is directed toward an apparatus for providing a high intensity atomic emission light source comprising a discharge lamp, at least first and second electrodes, first and second heating means and a controlling means. The discharge lamp has a discharge region and a sample region which are in fluid communication with each other. The first and second electrodes are positioned within the discharge region. The discharge lamp contains a noble gas and a sample gas. The first heating means is positioned for heating the discharge region whereas the second heating means is positioned for heating the sample region. The controlling means is provided for controlling the temperature of the sample region so as to maintain a constant discharge voltage across the electrodes during operation of said discharge lamp.

BRIEF DESCRIPTION OF THE DRAWINGS

The invention is described in relation to preferred embodiment in which.

DETAILED DESCRIPTION OF THE PREFERRED EMBODIMENTS

Theory

Figure 1:
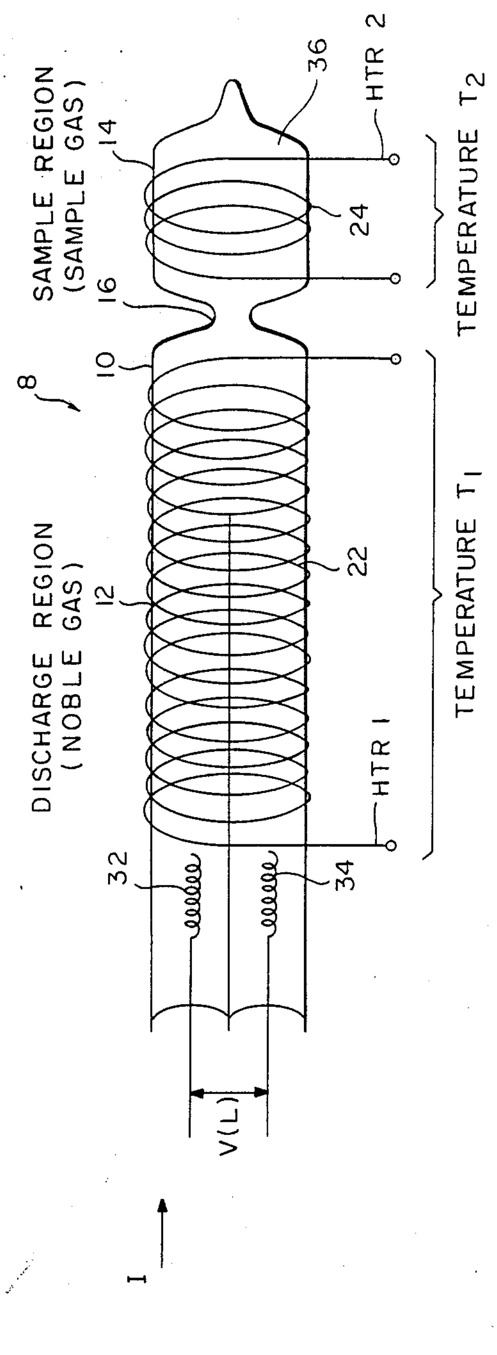
FIG. 1 is a drawing illustrating the basic lamp configuration.

Regardless of the type of lamp the energy of emitted light with frequency $\nu$ is given by Einstein's formula:

$$E=h\nu \tag{1}$$

If there are N atoms in excited states:

$$E=N\,h\nu \tag{2}$$

The intensity of light emitted by a light source is proportional to N. Therefore, for any light source, including lasers, the intensity is dependent on the rate of production of the excited state N. Furthermore, the stability of the intensity is dependent on the acts of production of this excited state N. If this production rate is constant, the only noise from the light source is proportional to the $\sqrt{N}$, from the theory of quantum electrodynamics, and if the value of N is high, one can obtain a light source which has practically no noise, e.g., $S/N=\sqrt{N}/N=1/\sqrt{N}\rightarrow o$.

Of course, no such light source exists; however, conceptually, such a light source, in principle, can be made. In the light source, the excited states N are produced by means of the electrical discharge of a low pressure cell normally containing a noble gas as well as atomic vapors other than a noble gas either in the form of a pure atomic vapor or in the form of compounds comprised of the atom to be excited. The mechanism of producing the excited atomic state density N is quite complex and differs from case to case. A phenomenological relationship can be established from the rate equation:

$$\frac{dN}{dt} = \sigma N_o F - \frac{1}{\tau} N \tag{4}$$

where $\sigma$=cross section of production of state N from the ground state $N_o$=density of ground state F=flux of colliding particles $\tau$=decay rate of state N If the mechanism of production of the excited state density N is constant, the light intensity is quite stable. The reason the light intensity would not be stable is because the density N changes.

Table I lists the possible causes of a change of N.

TABLE I

| POTENTIAL SOURCES THAT CAN PRODUCE VARIATION OF EXCITED STATE DENSITY N. |
|---|
| Ground State Density $N_o$: |
| The most probable cause is temperature variation, causing a change in vapor pressure. |
| Change in Discharge Current J: J = e F |
| The probable cause is a change in the lamp power supply. |
| Change in Electron Energy: |
| This is a very crucial factor, since o = f(E), where E is the energy of electrons. |

If the ground state density $N_o$, the electron energy, and the electron current remain constant, the lamp intensity must be constant and therefore very stable. In actual practice, before this present invention, lamps were always unstable since $N_o$ was not constant. In vapor lamps such as EDL, $N_o$ is determined by the vapor pressure. Thus, the temperature of the lamp is an extremely important factor.

The vapor pressure dependence on the temperature will now be discussed. Vapor pressure is presented in exponential form:

$$\log_{10} P = AT^{-1} + B\log_{10} T + CT + DT^2 + E$$

In most cases the following form is sufficient:

$$\log_{10} P = AT^{-1} + E$$

where P is vapor pressure in mm of $H_g$ and T is absolute temperature.

From the CRC Handbook of Chemistry and Physics for As (utilized, for example as a gas sample):

$$\log^{1}_{10} = \frac{A}{653} + E$$

$$\log^{10}_{10} = \frac{A}{713} + E$$

$$A = -7759.81$$

$$E = 11.883$$

Thus for As:

$$\log_{10} P = -7759.81\, T^{-1} + 11.883$$

Let us calculate what temperature would cause the vapor pressure to change 10% from 1 mm to 1.1 mm:

T=653.O° K. at 1.0 mm

T=655.3° K. at 1.1 mm

Thus a difference of only 2.3° C. will cause a 10% change in the vapor pressure. Assuming $\sigma$, the cross section, remains constant, a 2.3° C. change in the temperature would cause a 10% change in the light intensity.

The temperature in EDL's is supplied by the power input, usually microwave power at 2540 MHz, and a slight change in coupling can easily cause a 2° C. temperature difference, which in turn causes a 10% change in the light intensity. Such a large variation means that one can not measure atomic absorption to an accuracy greater than 10%. This large inaccuracy is completely unacceptable. This illustrates a problem associated with EDL, in addition to the life-time problem. For this reason, EDL is not used in atomic absorption work.

Low frequency discharge used in Zeeman atomic absorption suffers from a similar problem. In some cases, the difference in absorption between $\pi$ and $\sigma$ components is measured, so the stability problem is minimized. But, even in these cases the signal to noise ratio is severely affected by the intensity variation.

There is a more serious problem associated with variation in addition to the intensity fluctuation problem. The line profile of the emission light, resonance radiation, is absorbed by $N_o$ resulting in reduced intensity at the center of the line profile. This is called self-reversal. This severely affects the Zeeman atomic absorption signal. Therefore, it is very important to maintain the vapor pressure constant inside the lamp. The present invention deals with a way to maintain $N_o$, in spite of environmental changes, such an ambient air temperature.

Most lamps used in spectroscopy are operating at low current. Typically about a few mA and very seldom more than several hundred mA. In the electrical discharge, most of the tube is filled with a positive column. An example of this is a neon sign which shows color along the entire length of the tube, except for the portion close to terminal electrodes. This region consists of equal numbers of electrons and positive ions (plasma) and the mechanism of light emission is presumed to result from the mechanism of ionization by electron impact and recombination into the neutral atoms. This is the region where a high proportion of neutral resonance and ion lines occur. This is the type of discharge associated with EDL lamps. Thus, the light emitted from this region is the ideal source of light for atomic absorption and atomic fluorescence. The present invention utilizes the superior fundamental quality of positive column discharge with high stability which is not realized by EDL's nor with earlier low frequency discharge lamps with electrodes. For the first time, electrical discharge lamps operating in the positive column can be used as a source of light superior to HCL's and EDL's.

Apparatus and Control Method

Referring to FIG. 1, there is disclosed a discharge lamp 8 comprising a glass or quartz discharge tube 10 (transparent or translucent) having a first, discharge region 12 and a second, sample region 14 joined by a narrow fluid communication channel 16. The first region 12 is surrounded by a first heating coil 22, and the second region 14 is surrounded by a second heating coil 24. Each coil 22 and 24 is connected to a voltage source to permit a current to pass therethrough to heat regions 12 and 24 to temperatures $T_1$ and $T_2$ respectively. The tube 10 is further seen to comprise discharge electrodes 32 and 34 having means, such as a voltage source (not shown) for providing a discharge voltage V(L) therebetween. The current I to the lamp 8 is maintained constant. AC current is normally preferred for frequency dependent optical detection based on AC frequency. The tube 10 is filled with a noble gas (He, Ne, Ar, Kr, Xe) and a sample material 36 including a solid metal or metallic halide which vaporizes when heated. The sample may include elements of the group Cd, Zn, As, Se, T1, $PbI_2$ and $CnI_2$.

Although the heating coil 22 is shown only surrounding discharge region 12, it may also be extended to surround a portion of the sample region 14 nearest the discharge region 12 with the heating coil 24 positioned to surround the more distal end of the sample region 14.

A preferred design for the electrodes 32 and 34 is in a form of coil as illustrated in U.S. Pat. No. 3,686,529.

In general, in accordance with the invention, $T_1 > T_2$ and the noble gas pressure is between 1 torr and 100 torr. When the electrical discharge is turned on with $T_1 >> T_2$, only the noble gas discharge is observed since material other than the noble gas is forced out of the region 12 into region 14. By changing the temperature of $T_1$, the vapor pressure of sample atoms or compounds inside the discharge region is governed by:

$$\log_{10} P = AT_1^{-1} + B\log_{10} T_1 + CT_1 + DT_1^2 + E$$

In the ideal case, there is:

(1) no variation in electrical discharge power, i.e. the voltage V(L) across the terminals and the current I through the tube are constant;

(2) no variation in ambient temperature;

(3) no deterioration of an electrode due to sputtering, outgassing, or chemical reactions with the sample vapors or the noble gas;

(4) no chemical reaction of the sample vapor with the quartz envelope; and (5) no change in the vapor pressure curve of the sample material under the electrical discharge.

In reality all of these items vary. Change to any one of these items can cause variation in the density of ground state atoms.

The present invention accommodates the above mentioned effects and provides a constant ground state density No and hence provides a highly stable emitted light intensity. In the discharge current range of 1 mA to 100 mA the breakdown voltage remains constant. This is the region called glow discharge with normal cathode fall. This is the basis for a constant voltage regulator tube, since the breakdown voltage remains constant independent of the current when the current is between 1 mA and 100 mA. If the current is kept constant, the measurement of voltage determines the input power to the discharge lamp since:

$$\text{Power} = VI,\ I = \text{constant}$$

The breakdown voltage is a function of pressure as well as a function of the type of gas. Therefore, if the current is electronically held constant, the measurement of the discharge voltage across the terminals determines the normal discharge condition for the type of noble gas and the type of additional atomic or molecular vapor. Any variation of voltage from this value represents a change in the pressure.

Since the noble gas pressure follows the ideal gas law: PV=RT

The noble gas pressure must remain constant for constant temperature and any variation in pressure is linear with respect to temperature T. However, sample elements or compounds follow the vapor pressure curve of the type:

$$\log_{10}P = \frac{A}{T} + E$$

or $$P = e^{\frac{A}{T} + E} = e^{E}e^{\frac{A}{T}}\ \alpha\ e^{A/T}$$

Thus, it is clear that vapor pressure variation is much more sensitive for atoms or molecules whose vapor pressure is governed by exponential dependence than for atoms or molecules governed by the ideal gas law.

It is this extreme temperature dependence which causes instability of the light intensity.

Experimental determination of breakdown voltage versus temperature showed that the breakdown voltage is proportional to the temperature and is quite sensitive. It was discovered that by varying temperature in such a way that the breakdown voltage remains constant, the light intensity remains constant.

Thus, a very simple yet effective means to provide an extremely stable light output was discovered.

By way of explanation, and not by way of limitation, the following theory is believed to apply to the invention. The breakdown voltage is dependent on the actual density of the noble gas and the atomic or molecular sample material vapor pressure. Therefore, the breakdown voltage is independent of the effects of a metal - quartz reaction, a change in vapor pressure when the sample is subjected to electrical discharge under low pressure, etc.

As long as the temperature of the sample is adjusted to maintain a vapor pressure in the discharge such that the breakdown voltage remains constant, the ground state density, the cross section for excitation, the electron flux, etc. all remain constant. Therefore, the emitted intensity remains constant.

Experimental tests were made over a 200 hour period. Without a means of keeping the breakdown voltage constant, typical intensity variation was about ±10% over a 5 minute period using arsenic as the sample gas. With automatic temperature control to maintain the constant breakdown voltage, the intensity variation was within ±1% for over 100 hours.

The apparatus for implementing the control scheme discussed above will now be discussed in relation to FIG. 2.

Figure 2:
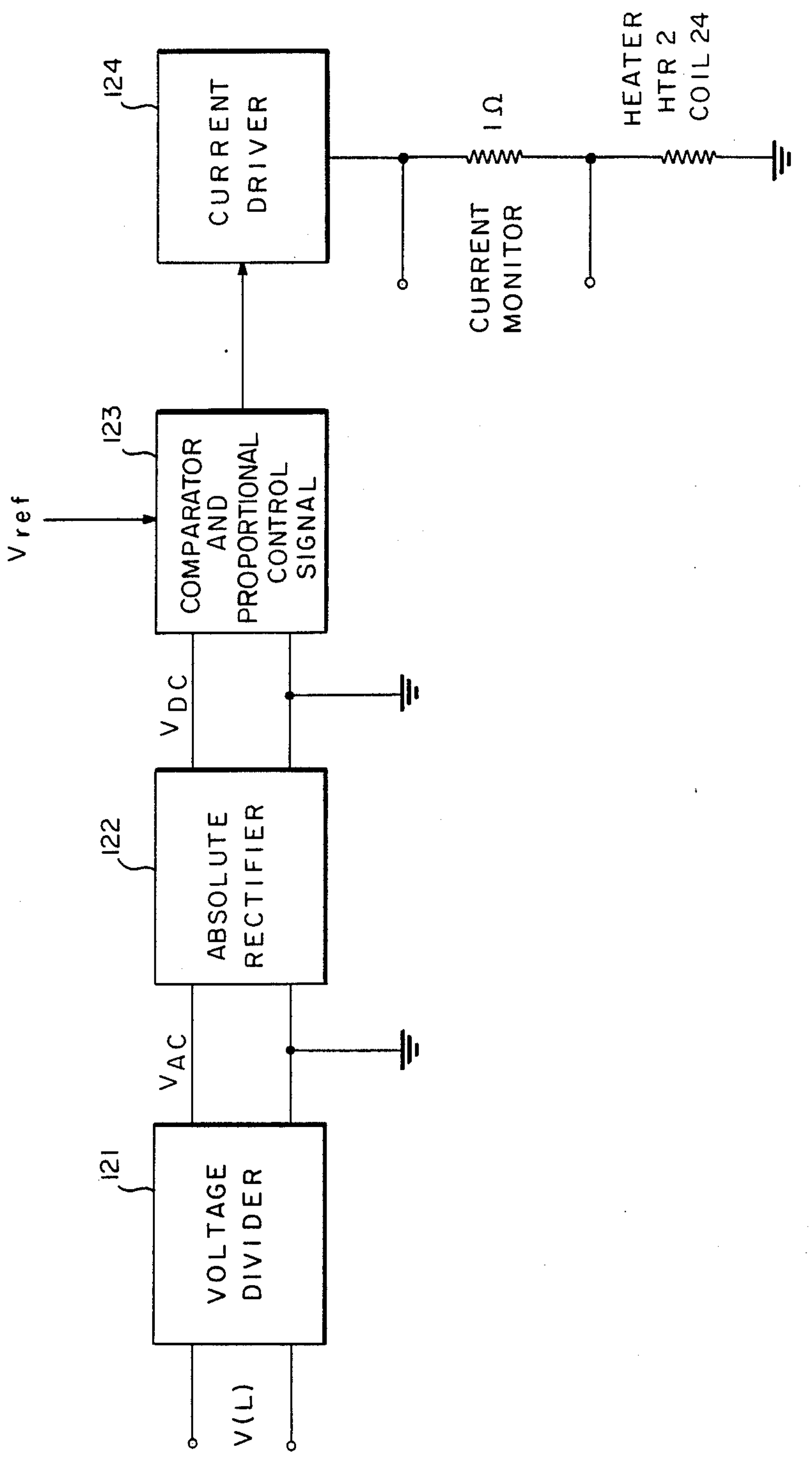
FIG. 2 is a block diagram of the lamp stabilizer circuit in accordance with the invention.

FIG. 2 illustrates a lamp stabilizer circuit 120 which is connected to drive the heating coil 24 of FIG. 1. The main purpose of this circuit is to keep the discharge voltage of the lamp, the voltage V(L) measured across the electrodes while the lamp is operating, constant at the level for which the intensity of the light is at a maximum and is most stable. This voltage regulation is achieved by changing or controlling the heat supplied to the sample region 14 of the lamp 8.

The voltage at which maximum light intensity is achieved is about 202 V for an arsenic sample but this value differs with different elements. Generally, the discharge voltage is higher at higher lamp temperatures. In addition, even a slight change in the lamp temperature causes the discharge voltage to vary drastically which causes the light intensity to change even more drastically, resulting in very unstable operation.

The lamp stabilizer circuit 120 is designed to vary the current to heating coils 24 in order to maintain the appropriate discharge voltage automatically.

For the purpose of the lamp stabilizer circuit 120, V(L) is reduced by a 1000:1 voltage divider 121 and A.C. is changed to D.C. in an absolute rectifier 122. Thus if V(L)=200 V, the divided voltage is 0.2 V; the rectified D.C. voltage $V_{DC}$ is compared with a reference voltage Vref; and a control signal is generated by the comparator and proportional control signal circuit 123. For example, if one wishes a discharge voltage of V(L)=202 V, then Vref=0.202 V and the comparator and proportional control signal circuit 123 operates as follows:

If $V_{DC}$ is greater than Vref then the heater current supplied to coil 24 by a current driver 124 should be lowered.

If $V_{DC}$ is less than Vref then the heater current supplied to coil 24 by current driver 124 should go up.

If the change is not abrupt but is maintained proportional to the difference between $V_{DC}$ and Vref, the control is called "proportional" control. Circuit element 123 may comprise either step or proportional control circuitry.

The comparator and proportional control signal circuit 123 in the preferred embodiment has a gain of 20. That is the difference between $V_{DC}$ and Vref is increased by a factor of 20 for outputting to the current driver 124. This gain may be increased as desired for tighter control. However thermal lag may cause an oscillation which must be taken into account.

The following is a typical operating schedule for turning on and maintain discharge voltage at 202 V.

1. Before the lamp is turned on set Vref=0. This will ensure that the current to heater coil 24 (HTR 2) is zero.

2. Turn heater coil 22 (HTR 1) to a high current for 15 minutes to drive the metal sample material from region 12 into region 14.
3. Reduce heater current to coil 22 to approximately 1.25 A.
4. Turn the discharge voltage on.
5. Set Vref to about 0.202 V.

At step 5, if the material (e.g. arsenic) is not totally driven out of region 12, Vref=0.202 V will keep the heater current in coil 24 very close to 0. Continual operation will reduce V(L) to a lower value. As V(L) approaches 202 V, the heater current in coil 24 begins to go up and eventually settles to the optimum operating current for the specific lamp being used.

In an alternate embodiment of the invention, the current to heating coil 22 is controlled as, for example, by utilizing a circuit such as shown in FIG. 2. In this case likewise $T_1$ is maintained greater than $T_2$. Generally, control of $T_1$ produces faster and grosser changes in pressure as compared with control of $T_2$. It is also possible to control both $T_1$ and $T_2$.

Figure 3:
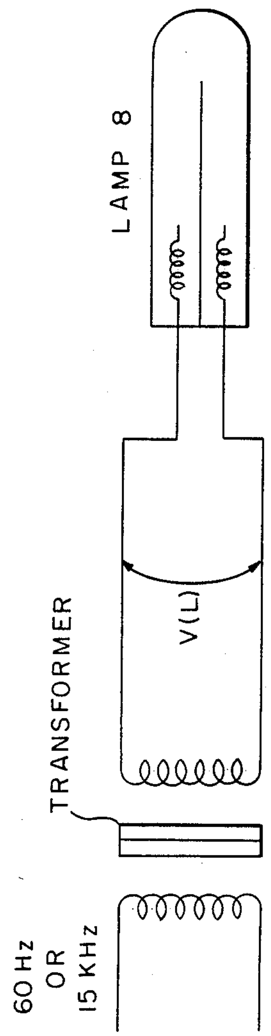
FIG. 3 illustrates the discharge voltage V(L) measurement.
Figure 4:
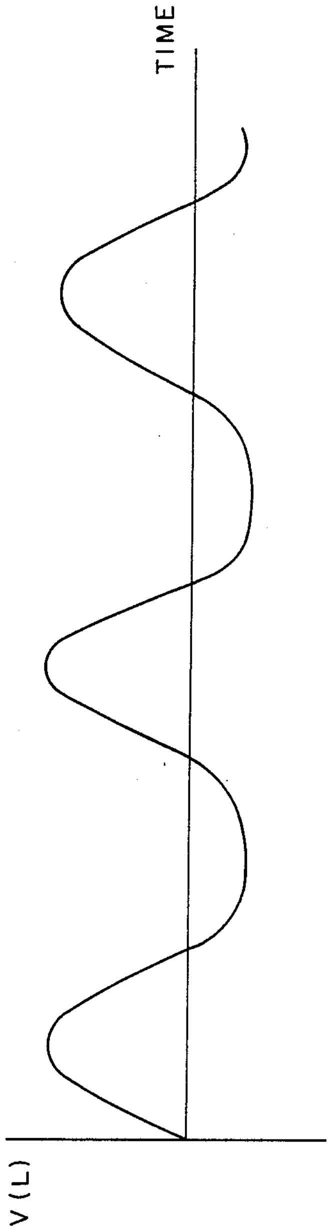
FIG. 4 illustrates the affect of a dirty lamp on the discharge voltage V(L) waveform.

The lamp discharge is maintained by A.C. through an appropriate transformer as shown in FIG. 3. Either 15 KHz or 60 Hz is typically used. Quite often, V(L) is not a symmetrical sine wave, especially when the lamp is not very clean. In this case, V(L) may appear as shown in FIG. 4.

Such lamps will frequently be destroyed since the electrode which operates more negatively will be sputtered quite rapidly. The A.C. voltage is about 180 V at room temperature (10 mA-200 mA) and about 202 to 204 V for a stable high intensity light output condition.

Yet an additional embodiment of the invention is achieved in utilizing a single heating coil wrapped around the discharge region 12 and sample region 14. The condition $T_1 > T_2$ is then achieved by having the discharge region 12 longer than the sample region 14 and/or having the coil density greater around the discharge region 12 than the sample region 14.

While the invention has been described in terms of preferred embodiments, it is understood that various modifications and improvements may be made by those of skill in the art and the invention is intended to cover all such modifications and improvements which fall within the spirit and scope of the appended claims.

What is claimed is:

1. Apparatus for providing a high intensity atomic emission light source comprising:
   (a) a discharge lamp having a discharge region and a sample region in fluid communication with each other;
   (b) at least first and second electrodes positioned within said discharge region;
   (c) said discharge lamp containing a noble gas and a sample material selected from a group consisting of individual elements and halides of refractory metals;
   (d) first heating means positioned for heating said discharge region;
   (e) second heating means positioned for heating said sample region;
   (f) means for detecting a discharge voltage across said electrodes; and
   (g) means responsive to said means for detecting for controlling said heating means to control a temperature of at least one of said sample region and said discharge region so as to maintain said discharge voltage constant across said electrodes during operation of said discharge lamp, wherein said first heating means operates to heat said discharge region to a temperature higher than that of said sample region.

2. Apparatus as recited in claim 1, wherein said constant discharge voltage produces a discharge current and the range of a few milliamps to several hundred milliamps.

3. Apparatus as recited in claim 1, wherein said constant discharge voltage produces a discharge current in the range of 1 milliamp to 100 milliamps.

4. Apparatus as recited in claim 1 wherein said controlling means comprises:
   (a) a voltage dividing means connected to receive a measure of said discharge voltage for generating a voltage which is proportional to said discharge voltage;
   (b) rectifying means, which receives the voltage from said voltage dividing means and generates a DC voltage corresponding thereto;
   (c) a comparator and proportional control signal means, for receiving said DC voltage and comparing said DC voltage with a reference voltage, said reference voltage representative of the maximum intensity of the light source, and said comparator and proportional control signal means generating an output signal proportional to the difference between said reference voltage and said DC voltage; and
   (d) a current driving means which receives said output signal for correspondingly adjusting the current to said at least one of said first and second heating means.

5. A method for maintaining the stability of a high intensity atomic emission light source having a discharge region and a sample region, which comprises the steps of:
   (a) generating a signal proportional to the discharge voltage of the light source in said discharge region;
   (b) comparing said discharge voltage with a reference voltage, said reference voltage selected to maximize the intensity of said light source;
   (c) generating a difference signal which is proportional to the difference between said reference voltage and said discharge voltage; and
   (d) adjusting the temperature of the discharge and/or sample region in response to said difference signal so as to maintain the discharge voltage constant.

6. A method as recited in claim 5 wherein said discharge voltage is an AC voltage and said generating step comprises these steps of:
   (a) voltage dividing said AC voltage to produce a reduced AC voltage; and
   (b) rectifying said reduced AC voltage to produce a DC voltage.

7. A method as recited in claim 6 wherein said comparing step comprises the step of comparing said DC voltage with a DC reference voltage to produce said difference signal.

* * * * *